United States Patent
Christopher

(10) Patent No.: US 7,182,385 B2
(45) Date of Patent: Feb. 27, 2007

(54) VEHICLE SEAT TRACK WITH HYDRAULIC ACTUATOR

(75) Inventor: Hugh H. Christopher, West Bridgford (GB)

(73) Assignee: Lear Corporation, Southfield, MI (US)

( * ) Notice: Subject to any disclaimer, the term of this patent is extended or adjusted under 35 U.S.C. 154(b) by 145 days.

(21) Appl. No.: 10/993,974

(22) Filed: Nov. 19, 2004

(65) Prior Publication Data

US 2005/0127703 A1  Jun. 16, 2005

(30) Foreign Application Priority Data

Dec. 10, 2003  (GB) ................................ 0328724.0

(51) Int. Cl.
*B60N 2/02* (2006.01)
(52) U.S. Cl. .................................................. 296/65.15
(58) Field of Classification Search ............. 296/65.13, 296/65.15; 297/344.1, 334.1; 248/429; 74/89.28
See application file for complete search history.

(56) References Cited

U.S. PATENT DOCUMENTS

| | | | |
|---|---|---|---|
| 2,660,223 A * | 11/1953 | Appleton .................. | 297/344.1 |
| 3,760,911 A | 9/1973 | Porter et al. | |
| 3,777,617 A | 12/1973 | Okiyama | |
| 3,860,098 A | 1/1975 | Porter et al. | |
| 3,927,911 A | 12/1975 | Rosquist | |
| 4,550,750 A | 11/1985 | Korth | |
| 4,720,143 A | 1/1988 | Schwartz et al. | |
| 5,435,625 A | 7/1995 | Weber | |
| 5,743,591 A | 4/1998 | Tame | |
| 6,015,130 A | 1/2000 | Kigel | |
| 6,047,797 A | 4/2000 | Popjoy | |
| 6,059,253 A | 5/2000 | Koutsky et al. | |
| 6,142,564 A | 11/2000 | Pajela et al. | |
| 6,161,633 A | 12/2000 | Broom | |
| 6,257,663 B1 * | 7/2001 | Swierczewski ........ | 297/216.19 |
| 6,382,491 B1 | 5/2002 | Hauser et al. | |
| 6,499,712 B1 * | 12/2002 | Clark et al. .................. | 248/429 |
| 6,736,380 B2 * | 5/2004 | Knapp ...................... | 267/64.12 |
| 6,742,838 B1 * | 6/2004 | Swierczewski .......... | 297/216.1 |
| 2002/0130542 A1 | 9/2002 | Ellerich et al. | |
| 2003/0209929 A1 | 11/2003 | Muin et al. | |
| 2004/0160095 A1 * | 8/2004 | Swierczewski ........ | 297/216.15 |
| 2005/0161967 A1 * | 7/2005 | Rashidy et al. .......... | 296/65.01 |

FOREIGN PATENT DOCUMENTS

| | | |
|---|---|---|
| DE | 202 15 969 | 2/2003 |
| DE | 101 52 561 | 5/2003 |
| EP | 0 316 675 | 5/1989 |
| EP | 0 878 348 | 11/1998 |

(Continued)

*Primary Examiner*—Lori L. Coletta
(74) *Attorney, Agent, or Firm*—MacMillan, Sobanski & Todd, LLC

(57) ABSTRACT

A vehicle seat assembly comprising a seat, and a seat track mounting adapted to slidingly mount the seat to a vehicle floor. The seat track mounting comprising an elongate slidingly engaged seat track member including a pair of spaced apart side flanges which define a channel section. The vehicle seat assembly further comprising a hydraulic actuator arranged in use to extend and retract as the seat is slidingly moved on the seat track mounting. This hydraulic actuator is located longitudinally within seat track member within the channel section and between the pair of side flanges.

11 Claims, 3 Drawing Sheets

FOREIGN PATENT DOCUMENTS

| | | |
|---|---|---|
| EP | 1 077 153 | 2/2001 |
| EP | 1 188 608 | 3/2002 |
| GB | 897955 | 6/1962 |
| GB | 2 167 494 | 5/1986 |
| GB | 2 173 344 | 10/1986 |
| GB | 2 365 947 | 2/2002 |
| JP | 2000-289507 | 10/2000 |
| WO | 03/026921 | 4/2003 |

* cited by examiner

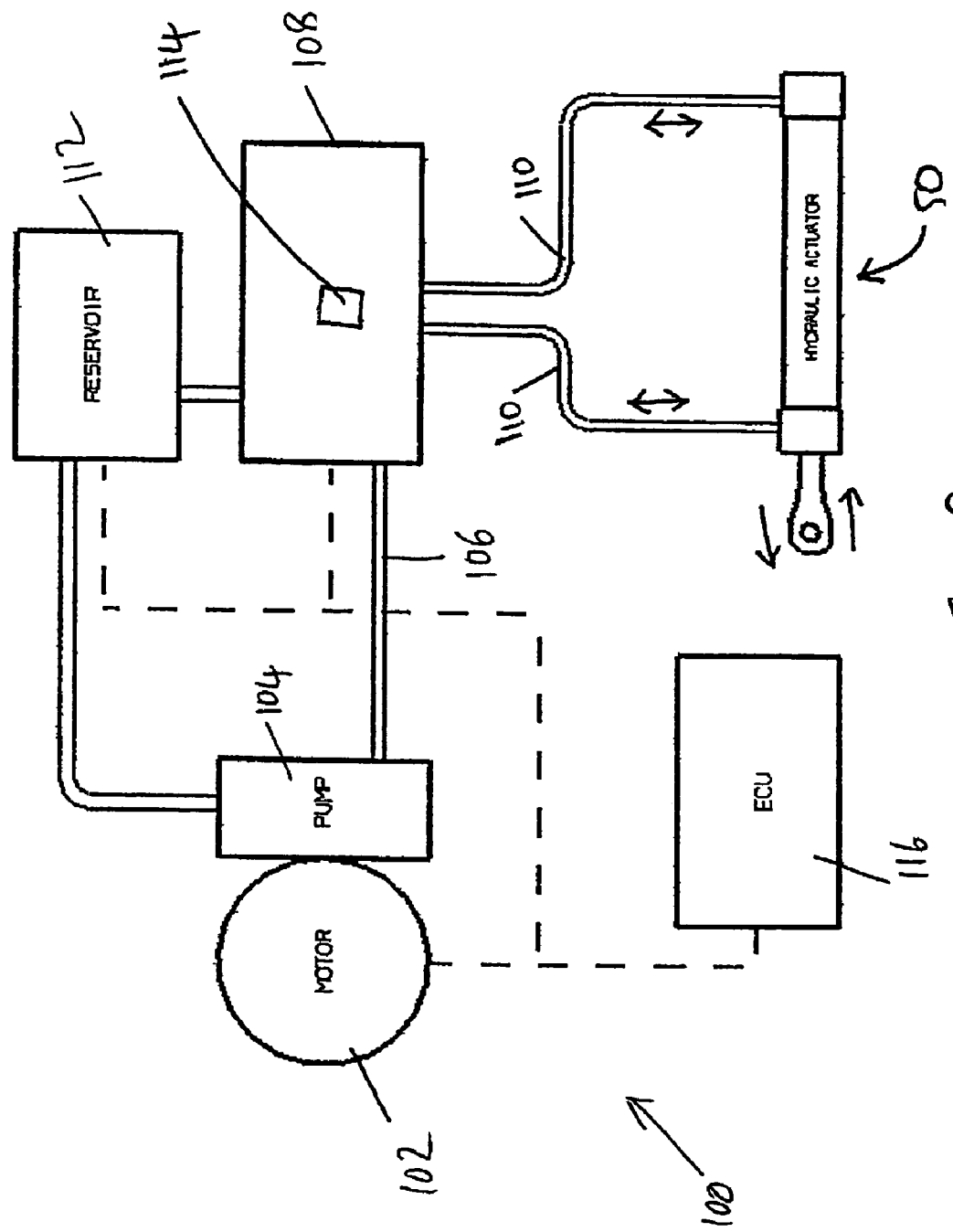

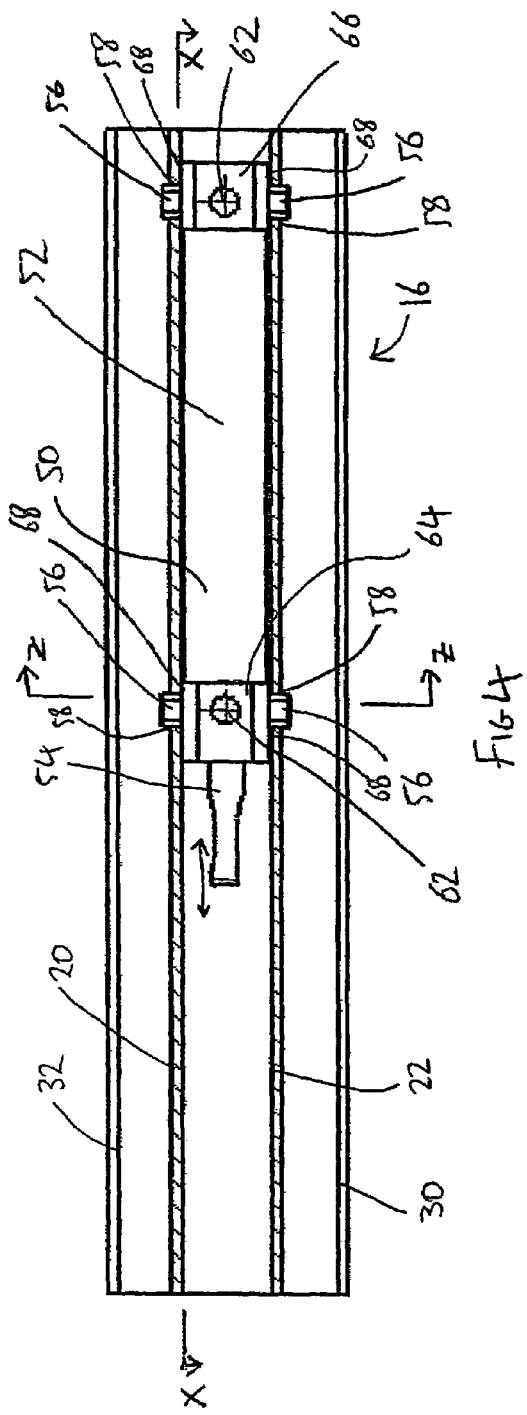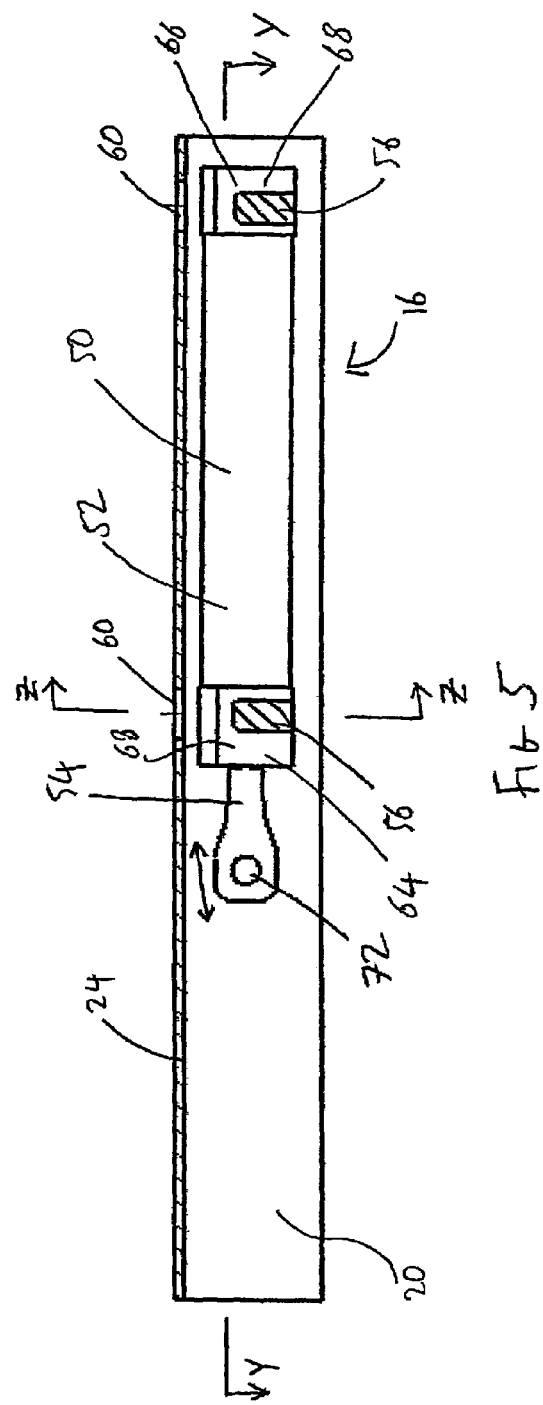

VEHICLE SEAT TRACK WITH HYDRAULIC ACTUATOR

CROSS REFERENCE TO RELATED APPLICATIONS

This application claims priority to Great Britain Patent Application No. 0328724.0 filed Dec. 10, 2003, the disclosures of which are incorporated herein by reference.

BACKGROUND OF THE INVENTION

The present invention relates to a vehicle seats, in particular vehicle seats incorporating an arrangement for fore and aft seat position adjustment incorporating a hydraulic actuator.

Vehicle seats are typically mounted to the vehicle floor by means of a pair of laterally spaced apart seat track assemblies which provide for fore and aft adjustment of the seat position longitudinally within the vehicle. The seat track assemblies comprise a pair of cooperating track members, typically upper and lower seat track members, which are slidingly engaged together such that they can slide longitudinally relative to each other. One of the seat track members attaches to the vehicle floor whilst the other is attached to the seat in order to slidingly mount the seat within the vehicle.

The fore and aft position of the seat may be manually adjusted by manually sliding the seat along the seat tracks with a locking mechanism associated with the either or both of the seat track assemblies to selectively lock the seat tracks and seat in the desired position. Alternatively, and increasingly, a powered arrangement may be provided in which an occupant activates a powered drive which drivingly moves the seat along the seat tracks.

To lock the seat in position, and/or to provide powered movement and adjustment of the seat position, hydraulic actuators have been proposed. These actuators comprise pistons which move within a cylinder displacing hydraulic fluid as the seat position is adjusted and the seat moves along the seat tracks. In the case of powered systems pressurised hydraulic fluid is supplied to the actuators to move the piston, whilst in manual systems the piston is moved within the cylinder displacing hydraulic fluid. By closing operating valves to prevent the flow of displaced hydraulic fluid the position of the piston and so of the seat can be fixed and locked.

An example of a manual seat adjustment arrangement incorporating a locking hydraulic cylinder is described in U.S. Pat. No. 5,743,591, whilst a hydraulically powered system incorporating a hydraulic actuator is described in U.S. Pat. No. 5,435,625.

Such hydraulic actuator arrangements offer smooth and almost infinitely variable adjustment and locking of the position of the seat. This can be contrasted with the incremental locking provided by conventional mechanical arrangements. Hydraulically powered arrangements also offer the prospect of extremely quiet, near silent, operation, without the noisy mechanical gearing. In spite of these, and other, advantages hydraulic actuators for seat adjustment have not been adopted for widespread automotive use.

In particular, a major problem with such hydraulic actuator arrangements is the size and resulting cost of the actuator that is required in a practical automotive system. Specifically to comply with automotive crash loading requirements the seat must provide sufficient structural strength and withstand high crash loading without failing or allowing excessive movement of the seat. With a hydraulic actuator providing the locking, extremely high pressures, for example in the region of 1700 bar, may be generated within the actuator under the applied crash loading. The actuator, and its structural mounting within the seat assembly, must be capable of withstanding these high generated pressures and crash loading forces. This increases the size of the actuator, the quality to which it must be made, and increases the costs. As a result, and in part due to this problem hydraulic systems have not been adopted for widespread commercial automotive use.

It is therefore desirable to provide improvements to automotive vehicle seat fore and aft adjustment arrangements incorporating a hydraulic actuator which addresses the above described problems and/or which offers improvements generally.

SUMMARY OF THE INVENTION

According to the present invention there is provided a vehicle seat assembly as described in the accompanying claims.

In an embodiment of the invention there is provided a vehicle seat assembly comprising a seat, a seat track mounting, and a hydraulic actuator. The seat track mounting is adapted to slidingly mount the seat to a vehicle floor. The seat track mounting comprises an elongate slidingly engaged seat track member including a pair of spaced apart side flanges which define a channel section. The hydraulic actuator is arranged in use to extend and retract as the seat is slidingly moved on the seat track mounting. The hydraulic actuator is located longitudinally within seat track member within the channel section and between the pair of side flanges.

By locating the hydraulic actuator within the channel section of the seat track member and between the pair of side flanges the seat track member reinforces and strengthens the actuator such that it is better able to withstand the high crash loads and high pressure generated during such crash loading. Buckling of the actuator under such crash loading is also constrained. As a result the strength of the arrangement is improved, and/or a lightweight, smaller, and so cheaper actuator can be used without unduly compromising strength. The actuator is also protected from damage by being located within the seat track assembly and enclosed within the seat track member between the side flanges.

The actuator typically comprises a hydraulic piston and cylinder assembly with an axially extending and retracting piston rod.

Preferably the seat track mounting comprises a pair of elongate slidingly interengaged seat track members. The hydraulic actuator is then disposed between the pair of elongate seat track members. In particular the seat track mounting comprises a pair of elongate slidingly interengaged seat track members. The cylinder of the hydraulic actuator is attached to a first of the pair of elongate slidingly interengaged seat track members, and the piston rod is connected to a second of pair of elongate slidingly interengaged seat track members. In this manner the actuator extends and retracts as the seat track member slide relative to each other with the first and second seat track member mounted to the seat and vehicle floor respectively.

The seat track member including a pair of spaced apart side flanges preferably further comprises an interconnecting portion interconnecting the side flanges to define a U shaped channel section.

The hydraulic actuator may also include at least one mounting lug which projects laterally from the hydraulic actuator. The mounting lug is engaged within a corresponding mounting aperture defined in the side flange of the seat track member. Preferably the hydraulic actuator includes a first mounting lug disposed at one end of the hydraulic actuator and a second mounting lug disposed at an opposite end of the actuator to locate the respective ends of the hydraulic actuator to the seat track member.

Such mounting lugs engaged in window apertures in the side flanges provide a simple and secure means to located and attached the actuator to the seat track member.

The hydraulic actuator may also includes first and second abutting surfaces which abut against the respective side flanges. This prevents rotation of the actuator within the seat track member and agin locates the actuator within the seat track member.

The seat track mounting typically comprises a pair of parallel laterally spaced apart seat track assemblies, at least one of the seat track assemblies including the hydraulic actuator located within the seat track assembly.

Other advantages of this invention will become apparent to those skilled in the art from the following detailed description of the preferred embodiment, when read in light of the accompanying drawings.

BRIEF DESCRIPTION OF THE DRAWINGS

FIG. 2 is a schematic simplified system diagram of a hydraulic powered vehicle seat adjustment system used with the vehicle seat shown in FIG. 1;

FIG. 4 is a plan cross sectional view of and through the upper seat track section of the seat track assembly shown in FIG. 1, on section Y—Y;

FIG. 5 is side cross sectional view of and through the upper seat track section of the seat track assembly shown in FIG. 1, on section X—X;

DETAILED DESCRIPTION OF THE INVENTION

Figure 1:
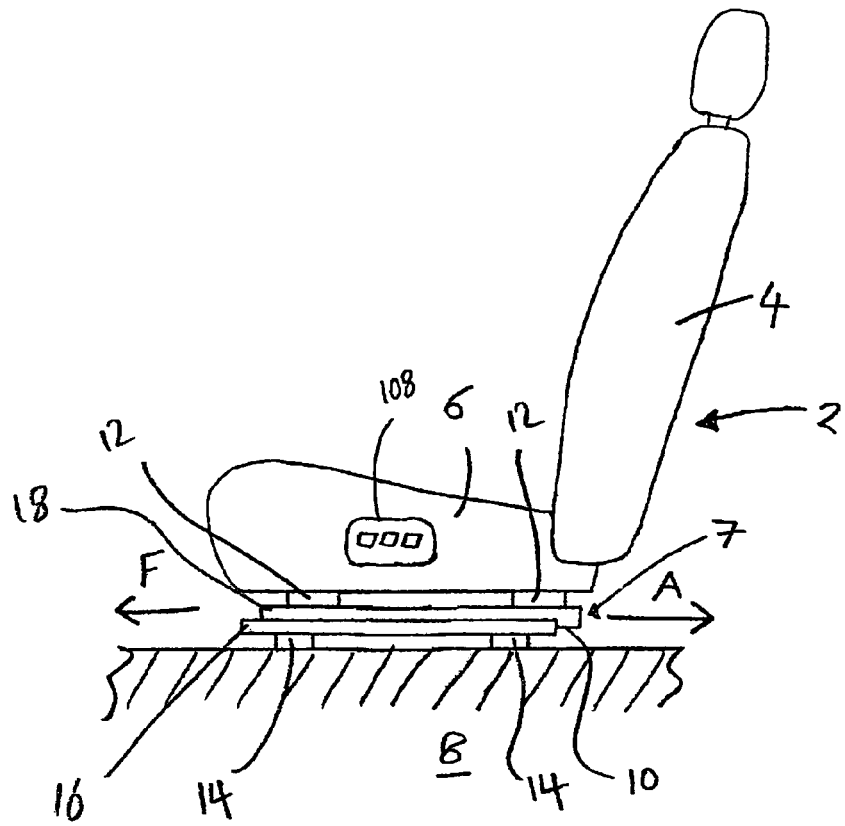
FIG. 1 is a schematic side view of a vehicle seat mounted to a vehicle floor via a seat track assembly.

Referring to FIG. 1, a vehicle seat 2, comprising a seat bottom cushion 6 and a seat back cushion 4, is slidably mounted to a vehicle floor 8 by a mounting arrangement 7 such that the seat 2 can be slid in a fore F and aft A direction to position the seat 2 longitudinally within the vehicle in a desired position as required by a seat occupant. The mounting arrangement 7 comprises a pair of seat track assemblies 10 which extend longitudinally, and are mounted at laterally spaced apart positions on the underside of the seat bottom cushion 6 interposed between the base of the seat bottom cushion 6 and vehicle floor 8. The seat track assemblies 10 are generally parallel to each other and mount and support the seat 2 on the vehicle floor 3. In FIG. 1, and in the subsequent figures, only one seat track assembly 10 is shown. It will though be appreciated that the other seat track assembly 10 for the seat 2 is generally similar.

Each seat track assembly 10 comprises a pair of cooperating upper 18 and lower 16 seat track members. The upper 18 and lower 16 seat track members are longitudinally slidably interengaged and interlocked together such that whilst secured together they can longitudinally slide relative to each other. The upper seat track member 18 is attached to the base of the seat 2 via suitable seat mounting brackets 12, whilst the lower seat track member 16 is connected to the vehicle floor 8 by floor mounting brackets 14. The interengaged seat track members 16, 18 of one of the seat track assemblies 10 are shown in end cross section more clearly in FIG. 3.

Figure 3:
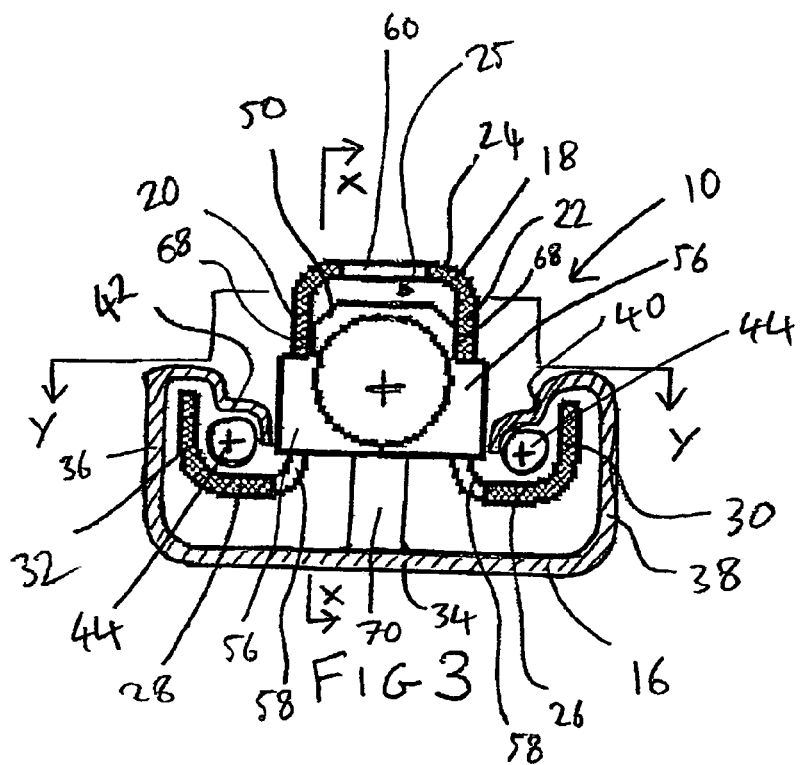
FIG. 3 is an end cross sectional view through the seat track assembly shown in FIG. 1, and on section Z—Z.

Referring to FIG. 3, the upper seat track member 18 comprises an elongate section comprising a pair of parallel laterally spaced apart side portion flanges 20,22 which extend from a central interconnecting portion 24 perpendicular to the side portions 20,22 to form an inverted U shaped central channel section. A pair of lateral shoulder flanges 26,28 project laterally outwardly from, and along, the lower edges of the respective side portions 20,22 perpendicular to the side portions 20,22. The lateral shoulder flanges 26,28 interconnect the side portions 20,22 with further side edge portions 30,32 which project from and along the lateral shoulder flanges 26,28. The side edge portions 30,32 are generally parallel to the side portions 20,22 and are laterally spaced therefrom to form a pair of smaller U shaped cross section channels along either lateral sides of the central section.

The lower seat track member 16 comprises a corresponding elongate channel section comprising a pair of laterally spaced apart parallel side flanges 36,38 which extend and project from a central interconnecting base section 34. These form a U shaped channel section slightly wider than the upper seat track member 18. The upper seat track member 18 fits within the lower seat track member 16 and is retained by retaining edge flanges 40,42 which project inwardly from along the edges of the side flanges 36,38 of the lower seat track member 16. The retaining edge flanges 40,42 laterally overlap the lateral shoulder flanges 26,28 of the upper seat track member 18 with the edge flanges 40,42 projecting part way into the smaller U shaped cross section channels. A plurality of ball bearings 44, and bearing arrangement, are preferably provided within and along the smaller U shaped cross section channels and are retained therein between the edge flanges 40,42 and lateral shoulder flanges 26,28 and side edge portions 30,32. The ball bearings 44 allow the upper and lower seat track members 16,18 to more easily slide relative to each other.

In this embodiment a powered hydraulic adjustment system 100 is provided to slide the seat 2 on the seat track assemblies 10 and adjust the seat 2 position in the fore F and aft A direction as required. The hydraulic adjustment system 100 is shown schematically in FIG. 2. The adjustment system 100 comprises an electric motor 102 driving a hydraulic pump 104 which is connected via hydraulic pipes 106 and a control valve assembly 108 to selectively supply pressurised hydraulic fluid via feed and return pipes 110 to respective hydraulic actuators 50. The hydraulic fluid is returned from the actuators 50 via further control valves in the control valve assembly 108 and a reservoir 112 back to the pump 104 to complete a hydraulic circuit. Control valves in the control valve assembly 108 are activated by switches 114 operated by a seat occupant to selectively direct the pressurised fluid to the actuators 50 as required to moved the seat 2 into the desired position. The actuators 50, in this case a pair of actuators 50 one for each seat track assembly 10 are arranged to when activated and appropriately supplied with hydraulic fluid extend or retract to move the seat in a fore F or aft A direction.

An electronic control unit 116 may also be provided and operatively connected to the motor 102 and control valve assembly 108 to monitor and control the operation of the seat 2 adjustment. Such electronic control units 108 and their operation are well known.

The actuators 50 comprise a hydraulic cylinder 52 with a piston rod 54 which is extended from or retracted into the cylinder 52 in response to the pressurised hydraulic fluid supplied to the cylinder 52. The seat 2 includes a pair of actuators 50 for fore F and aft A adjustment with an actuator 50 associated with each seat track assembly 10. The actuators 50 are operatively connected between the seat 2 and vehicle floor 8 such that extension and retraction of the piston rod 54 moves the seat 2 in fore F and aft A direction. When the control valves are closed the flow of hydraulic fluid from the actuators 50 is prevented which locks the actuator 50 and piston rod 54 in position, thereby locking and fixing the seat 2 fore and aft position.

As shown in FIGS. 3 to 5 the respective actuators 50 are in accordance with the invention mounted and enclosed within the respective seat track assemblies 10. In FIGS. 4 and 5 only the upper seat track section and actuator are shown with the lower seat track assembly being omitted form these figures. Specifically in this embodiment the actuator 50 is disposed longitudinally along and within the inverted U shaped central channel section 25 of the upper seat track member 16 between the two side portions 20,22 and central interconnecting portion 24, with the lower seat track member 16 enclosing the remaining side of the actuator 50.

The actuator 50 is secured in position longitudinally within the upper seat track member 18 by projecting mounting lugs 56 which project laterally from the actuator cylinder 52. The mounting lugs 56 project beyond the width of the U shaped central channel section 25 and spacing between the side portion flanges 20,22 of the upper seat member 18 and are engaged within corresponding window apertures 58 defined in the side flange portions 20,22 of the upper seat member 18. The window apertures 58 are dimensioned, as shown in FIG. 3, and extend part way into the lateral shoulder flanges 26,28 to allow the actuator 50 and mounting lugs 56 to be slotted vertically into the central channel section 25, as shown in FIG. 3 form below. Mounting fasteners (not shown) are fitted through further apertures 60 in the central interconnecting portion 24 and are engaged within corresponding threaded bores 62 in the actuator 50 to secure the actuator cylinder 52 within and to the upper seat track member 18. The mounting lugs 56 preferably comprise, as shown, integral projections from respective end cap assemblies 64,66 of the actuator 50. The end caps 64,66 preferably have a rectangular cross section, or at least flat side surfaces 68 which abut against the side flange portions 20,22 of the upper seat track member 18 and further secure the actuator 50 in position within the U shaped central channel 25 and in particular prevent it from rotating. The end caps 64,66 close off the hydraulic cylinder 52 and main tubular body of the actuator 50 within which a piston is located. The piston rod 54 is connected to the piston, and extends and retracts from the actuator cylinder 52 and within the U shaped channel section 25 of the upper seat track member 18. The piston rod 54 extends through an end of one of the end caps 64. A piston rod attachment bracket 70 projects upwardly from the centre of the base 34 of the lower seat track member 18. The piston rod 54 is connected to the piston rod bracket 70 by a suitable fastener or pin (not shown) engaged within a mounting eye 72 defined in the end of the piston rod 54 and corresponding aperture (not shown) in the piston rod bracket 70. Accordingly in use extension and retraction of the actuator 50 and piston rod 54 sliding moves the upper and lower seat track members 16,18 relative to each other and so moves the seat 2 in a fore and aft direction.

The actuator 50, whilst a distinct element, is accordingly integrated into and within the seat track assembly 10. This simplifies the arrangement since the seat track assembly 10 including the actuator 50 can be assembled as a complete unit and then fitted to the seat 2 as a complete unit rather than as separate elements. Furthermore, and more significantly, by locating the actuator 50 closely within the seat track members 18, between the side flange portions 20,22 and within the U shaped channel 25, the seat track member 18 reinforces and provides additional strength to the actuator 50. The U shaped profile and section of the seat track member 18 in particular provide a particularly strong structure. As a result the actuator 50 can better withstand the high pressure and loads generated during crash loading, and/or alternatively can be made much smaller, lighter or more cheaply than if not reinforced by the seat track member 18. In addition under crash loading the actuator 50 may typically be subjected to large compressive axial loading. This can lead to bucking of the piston rod 54 and/or actuator 50, which in conventional arrangements can lead to failure of the actuator 50 and allowing the seat 2 to unacceptably move under such crash loading. With the actuator 50 and piston rod 54 located within the seat track member 18 and within the U shaped channel 25 buckling of the piston rod 54 and actuator 50 is constrained and restricted, with the piston rod 54 only being able to bend and buckle to a limited degree until it contacts the side flange portions 20,22 of the seat track member 18 or other parts of the seat track member 16,18. Accordingly buckling of the piston rod 54 is constrained, with any further buckling requiring significantly higher forces. This limits the resultant movement under such crash loading, and allows a long slender actuator 50 and piston rod 54 to be used. Such a slender, smaller diameter, actuator 50 is cheaper and lighter. A relatively long actuator is also desirably required to provide the full range of movement for the seat 2. A small diameter actuator 50 is also easier to accommodate within the seat track assembly 10 and within the seat 2.

A further advantage of this arrangement is that the end caps 64,66 of the actuator 50 are held in position axially and longitudinally by their engagement within the windows 58 in the seat track member 18. As a result the end caps 64,66 which would tend to be forced axially off and from the cylindrical main body 52 of the actuator 50 under the pressure therein are more securely held axially together on the ends of the actuator 50. This reduces a common potential area of weakness of the actuator 50 and means that a less robust, and so cheaper attachment of the end caps 64,66 to the actuator cylinder 52 can be used.

The actuator 50, which with its moving slender piston rod 54 may conventionally be susceptible to damage, is also protected by being located within the seat track member 18.

It will be appreciated that a number of further detailed modifications of the basic arrangement described and shown can be made.

In particular whilst described above in relation to a powered hydraulic adjustment system 100, the invention can also be applied to a manual adjustment system in which a hydraulic actuator 50 is used to simply lock the position of the seat 2. In such an arrangement the hydraulic actuators 50 within the seat track assemblies 10 are simply connected to a control valve which selectively controls the flow of hydraulic fluid displaced by the actuator 50 as the actuator 50 is extended and retracted during sliding of the seat 2 in the fore F and aft A directions. Closure of the valve prevents a flow of displaced fluid thereby preventing extension of retraction of the actuator 50 and so movement of the seat 2.

Also the seat track assemblies 10 and seat track members 16,18 whilst still enclosing the actuator 50 mounted therein may have different detailed cross sectional profiles. In particular the seat track assemblies can be modified to provide a further second channel for, and to protect the actuators 50, in addition to a main channel section of the seat track assembly. The channel section for the actuator 50 may also be extended beyond that of the main seat track length, and comprise an extension of the seat track to provide adequate protection of the actuator along the entire operating length. The channel section of the seat track may also comprise part of only one of the upper or lower seat tracks alone.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A vehicle seat assembly comprising:
   a seat;
   a seat track mounting adapted to slidingly mount the seat to a vehicle floor, the seat track mounting comprising an elongate slidingly engaged seat track member including a pair of spaced apart side flanges which define a channel section; and
   a hydraulic actuator arranged in use to extend and retract as the seat is slidingly moved along the seat track mounting;
   wherein the hydraulic actuator is located longitudinally within seat track member within the channel section and between the pair of side flanges.

2. A vehicle seat assembly as claimed in claim 1 in which the actuator comprises a hydraulic piston and cylinder assembly with an axially extending and retracting piston rod.

3. A vehicle seat assembly as claimed in claim 1 in which the seat track mounting comprises a pair of elongate slidingly interengaged seat track members.

4. A vehicle seat assembly as claimed claim 3 in which the hydraulic actuator is disposed between the pair of elongate seat track members.

5. A vehicle seat assembly as claimed in claim 2 in which the seat track mounting comprises a pair of elongate slidingly interengaged seat track members, and in which the cylinder of the hydraulic actuator is attached to a first of the pair of elongate slidingly interengaged seat track members, and the piston rod is connected to a second of pair of elongate slidingly interengaged seat track members.

6. A vehicle seat assembly as claimed in claim 1 in which the seat track member including a pair of spaced apart side flanges further comprises an interconnecting portion interconnecting the side flanges to define a U shaped channel section.

7. A vehicle seat assembly as claimed in claim 1 in which the hydraulic actuator includes at least one mounting lug which projects laterally from the hydraulic actuator, with the mounting lug engaged within a corresponding mounting aperture defined in the side flange of the seat track member.

8. A vehicle seat assembly as claimed in claim 7 in which the hydraulic actuator includes a first mounting lug disposed at one end of the hydraulic actuator and a second mounting lug disposed at an opposite end of the hydraulic actuator to locate respective ends of the hydraulic actuator to the seat track member.

9. A vehicle seat assembly as claimed in claim 1 in which the hydraulic actuator includes first and second abutting surfaces which abut against the respective side flanges.

10. A vehicle seat assembly as claimed in claim 1 in which the seat track mounting comprises a pair parallel laterally spaced apart seat track assemblies, at least one of the seat track assemblies including the hydraulic actuator located within the seat track assembly.

11. A vehicle seat assembly as claimed in claim 10, wherein one of the seat track assemblies includes the hydraulic actuator located within said one of the seat track assemblies, and wherein the other one of the seat track assemblies includes a second hydraulic actuator located within said other one of the seat track assemblies.

* * * * *